US010316738B2

(12) United States Patent
Niwa et al.

(10) Patent No.: US 10,316,738 B2
(45) Date of Patent: Jun. 11, 2019

(54) TURBOCHARGER ENGINE

(71) Applicant: MAZDA MOTOR CORPORATION, Hiroshima (JP)

(72) Inventors: Yasushi Niwa, Higashihiroshima (JP); Hiroshi Sumimoto, Aki-gun (JP); Mitsuhiro Nakajima, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 106 days.

(21) Appl. No.: 15/609,531

(22) Filed: May 31, 2017

(65) Prior Publication Data

US 2017/0342895 A1 Nov. 30, 2017

(30) Foreign Application Priority Data

May 31, 2016 (JP) ................................ 2016-108957

(51) Int. Cl.
*F02B 37/013* (2006.01)
*F02B 37/00* (2006.01)
(Continued)

(52) U.S. Cl.
CPC .......... *F02B 37/013* (2013.01); *F02B 37/004* (2013.01); *F02B 67/10* (2013.01);
(Continued)

(58) Field of Classification Search
CPC ........ F02M 37/00; F02M 37/04; F02B 37/00; F02B 37/013; F02B 37/004; F02C 6/12
(Continued)

(56) References Cited

U.S. PATENT DOCUMENTS 4,469,078 A * 9/1984 Speer ................... F02B 37/164
123/564
4,930,315 A * 6/1990 Kanesaka ............... F02B 29/00
60/600
(Continued)

FOREIGN PATENT DOCUMENTS

EP 2 261 481 B1 7/2014
JP H03-149343 A 6/1991
(Continued)

OTHER PUBLICATIONS

JP Office Action dated Mar. 27, 2018, from corresponding JP Appl No. 2016-108957, with English translation, 6 pp.

*Primary Examiner* — Thai Ba Trieu
(74) *Attorney, Agent, or Firm* — Studebaker & Brackett PC

(57) ABSTRACT

A turbocharger engine includes an engine body and a turbocharger. The turbocharger includes a large turbo unit having a large turbine chamber, a large compressor chamber, and a large turbine shaft extending between the two chambers; and a small turbo unit having a small turbine chamber, a small compressor chamber, and a small turbine shaft extending between the two chambers. The large compressor chamber is disposed upstream of the small compressor chamber in an intake passage. A large turbo axis and a small turbo axis are disposed to extend generally in the same direction as an engine output axis. The large turbo unit is disposed such that the large turbo axis is non-parallel to the engine output axis, and a large-compressor-chamber-side portion of the large turbo axis is closer to the engine output axis than a large-turbine-chamber-side portion thereof in a plan view in an axis direction of the cylinder.

6 Claims, 14 Drawing Sheets

(51) Int. Cl.
  *F02B 75/20* (2006.01)
  *F02M 35/10* (2006.01)
  *F02B 67/10* (2006.01)
(52) U.S. Cl.
  CPC ....... *F02B 75/20* (2013.01); *F02M 35/10157* (2013.01); *Y02T 10/144* (2013.01)
(58) Field of Classification Search
  USPC ............................................ 60/612; 123/562
  See application file for complete search history.

(56) References Cited

U.S. PATENT DOCUMENTS

| | | | |
|---|---|---|---|
| 8,397,503 B2 | 3/2013 | Niwa et al. | |
| 2017/0342894 A1* | 11/2017 | Niwa | .................... F04D 17/127 |
| 2018/0038290 A1* | 2/2018 | An | ........................... F02D 9/04 |

FOREIGN PATENT DOCUMENTS

| | | | |
|---|---|---|---|
| JP | 2000-045780 A | | 2/2000 |
| JP | 4941512 B2 | | 5/2012 |
| JP | 2013-060820 A | | 4/2013 |
| JP | 2013060820 A | * | 4/2013 |
| JP | 2015-161276 A | | 9/2015 |

* cited by examiner

FIG. 2
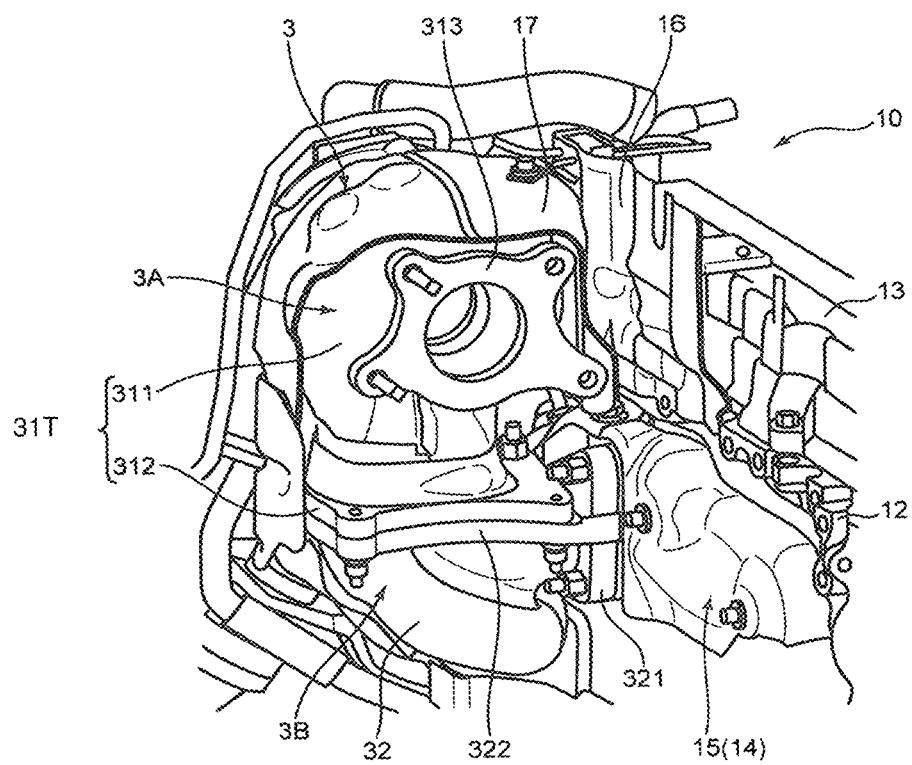
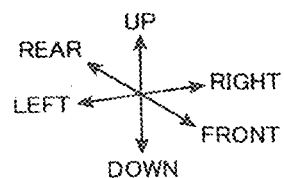

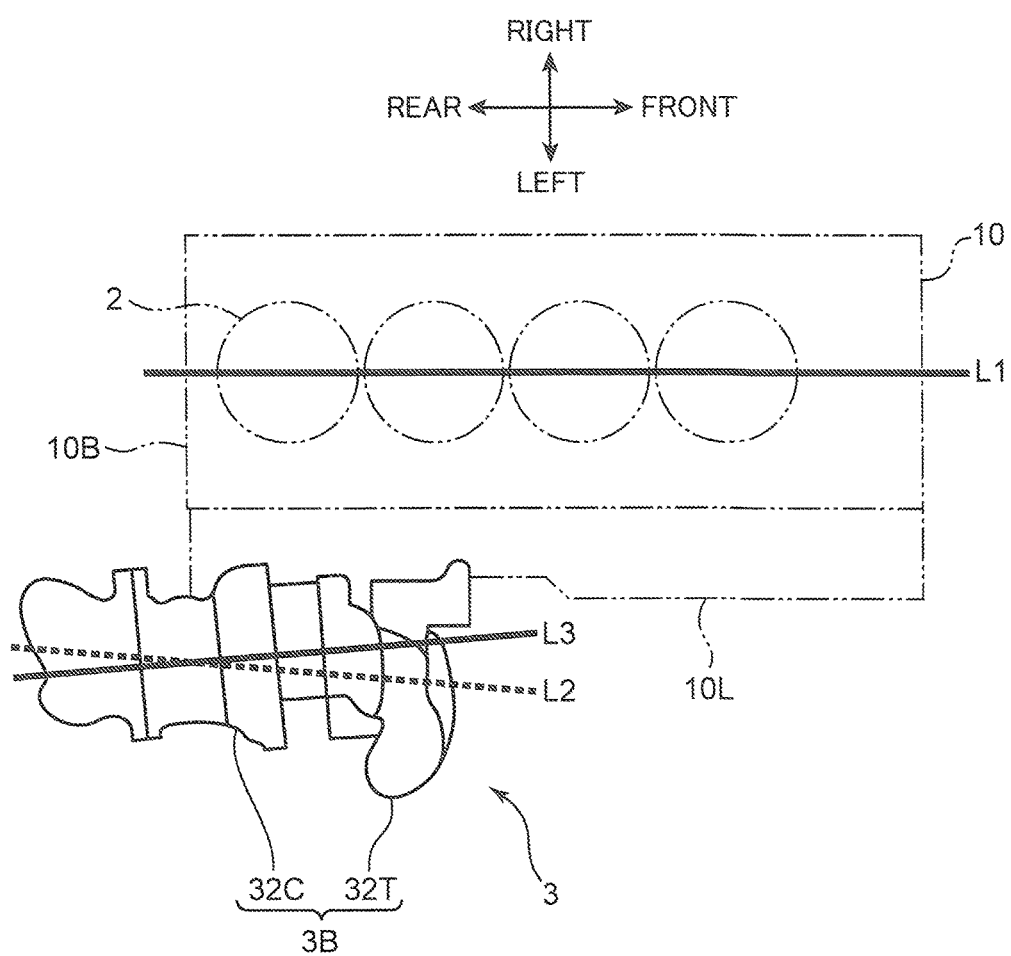

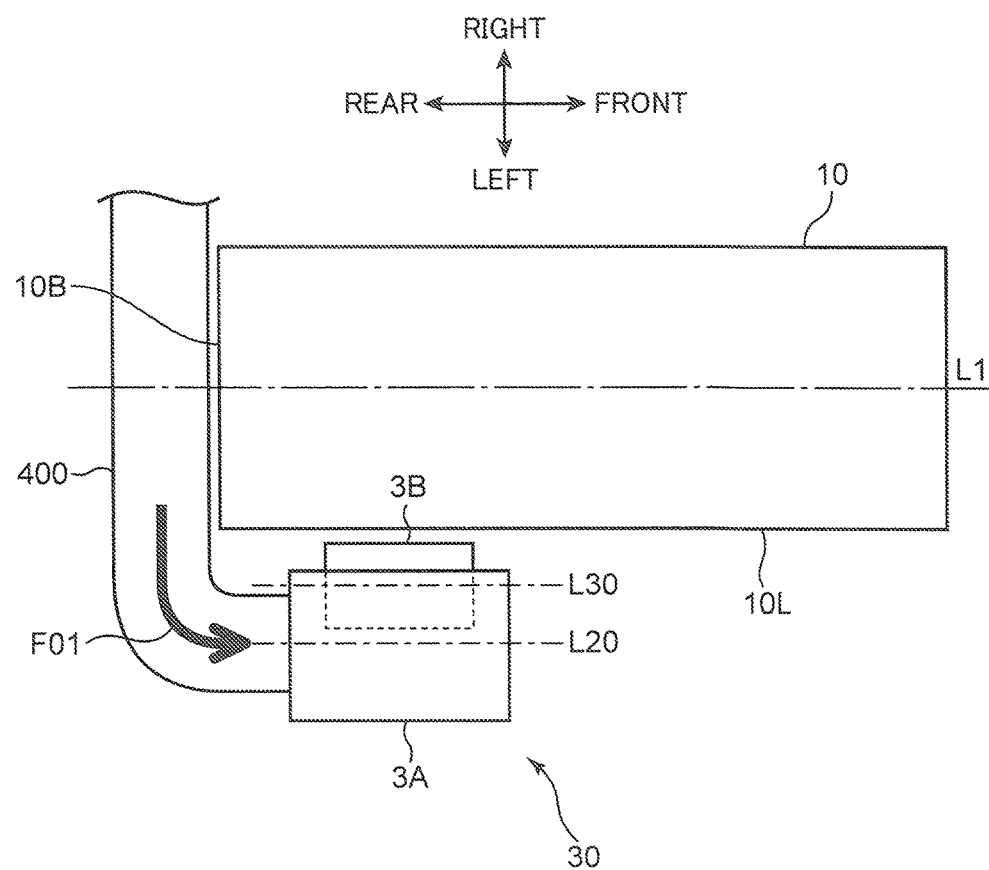

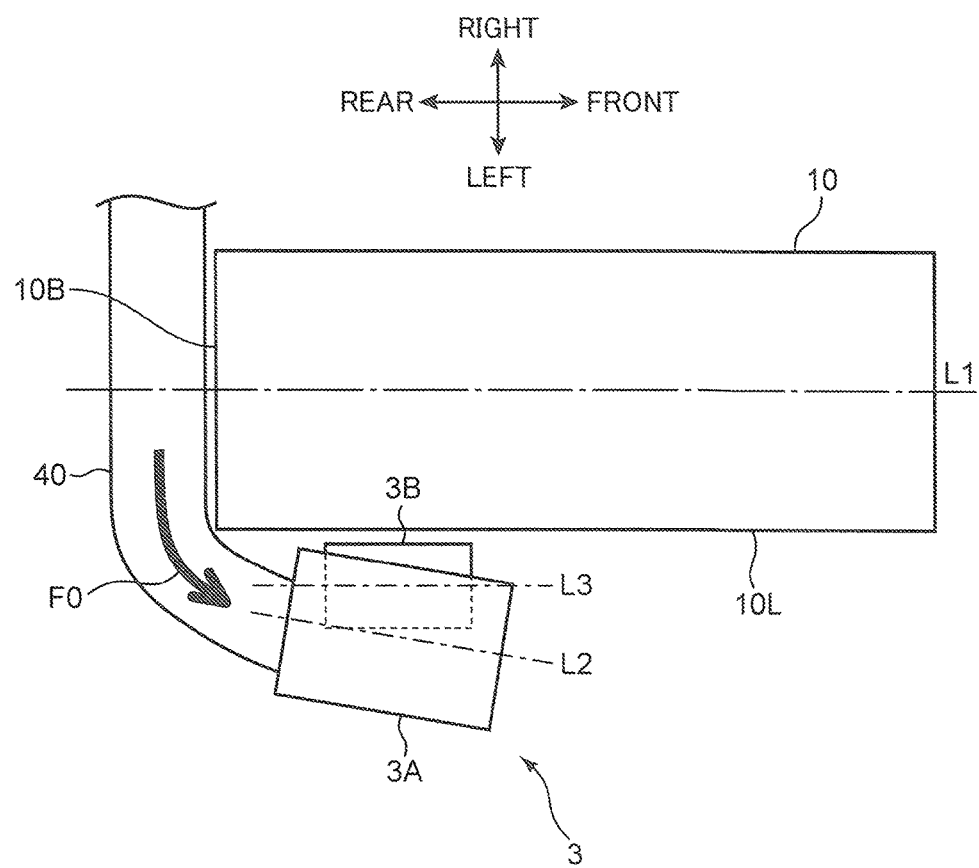

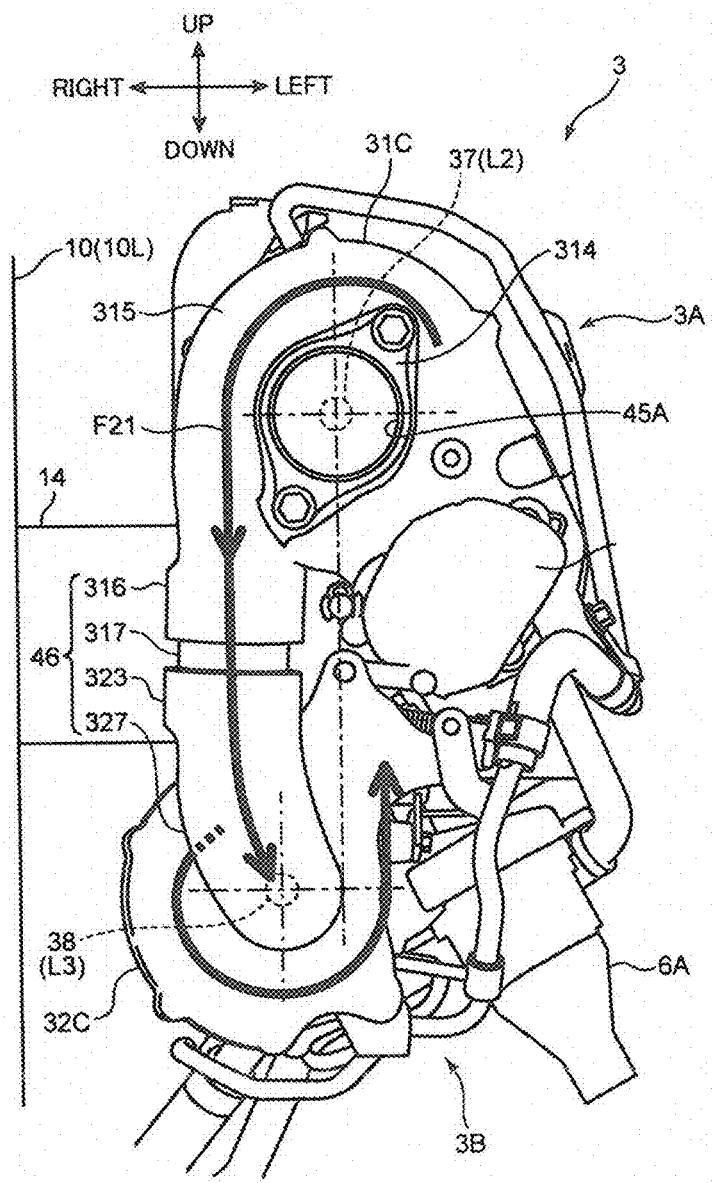

TURBOCHARGER ENGINE

TECHNICAL FIELD

The present invention relates to a turbocharger engine provided with a turbocharger including two independent turbo units in an engine body.

BACKGROUND ART

In a turbocharger engine, a turbocharger configured to supercharge intake air by using exhaust energy of an engine is mounted adjacent to a side wall of an engine body. An exhaust passage and an intake passage are formed in a housing of the turbocharger. A turbine chamber configured to accommodate a turbine communicates with the exhaust passage. A compressor chamber configured to accommodate a compressor impeller communicates with the intake passage. Exhaust air is supplied to the exhaust passage from the engine body, and intake air to be supplied to the engine body flows through the intake passage. The turbine is rotated around a turbine shaft by exhaust air to rotate the compressor impeller in the compressor chamber, which is connected to the turbine shaft to supercharge intake air.

Conventionally, there is a known turbocharger in which two independent turbo units are disposed in series in an exhaust passage. For instance, U.S. Pat. No. 8,397,503 discloses a dual stage turbocharger provided with a large turbo unit configured to be mainly operated in an intermediate speed range to a high speed range of an engine, and a small turbo unit configured to be mainly operated in a low speed range of the engine. Each of the large turbo unit and the small turbo unit includes a turbine chamber, a compressor chamber, and a turbine shaft extending between the turbine chamber and the compressor chamber.

In a turbocharger, there is a demand for supplying intake air to a compressor chamber while reducing a resistance (an intake resistance) against a flow of intake air as much as possible in order to improve supercharging efficiency. In the case of an engine provided with a dual stage turbocharger, however, it is necessary to miniaturize the turbocharger regardless of complication of the intake passage layout. Therefore, it may be difficult to reduce an intake resistance. Further, usually, a turbocharger is mounted on an engine body in such a manner that a turbine shaft of the turbocharger is aligned in parallel to a crankshaft (an output shaft) of the engine body. The inventors of the present application found that the aforementioned matter is one of the reasons why the flexibility of the intake passage layout is restricted.

SUMMARY OF INVENTION

An object of the present invention is to provide a turbocharger engine provided with a turbocharger including a large turbo unit and a small turbo unit, which enables to reduce an intake resistance and to improve supercharging efficiency.

In order to attain the aforementioned object, a turbocharger engine according to an aspect of the present invention includes an engine body provided with a cylinder, and an engine output axis; and a turbocharger disposed adjacent to the engine body, and including an exhaust passage through which exhaust air is supplied from the engine body, and an intake passage through which intake air is supplied to the engine body to supercharge the intake air.

The turbocharger includes a large turbo unit and a small turbo unit. The large turbo unit includes a large turbine chamber communicating with the exhaust passage and configured to accommodate a large turbine, a large compressor chamber communicating with the intake passage and configured to accommodate a large compressor, and a large turbine shaft extending between the large turbine chamber and the large compressor chamber to connect between the large turbine and the large compressor. The large turbo unit is mainly operated in an intermediate speed range to a high speed range of the engine body. The small turbo unit includes a small turbine chamber communicating with the exhaust passage and configured to accommodate a small turbine, a small compressor chamber communicating with the intake passage and configured to accommodate a small compressor, and a small turbine shaft extending between the small turbine chamber and the small compressor chamber to connect between the small turbine and the small compressor. The small turbo unit is mainly operated in a low speed range of the engine body.

The large compressor chamber is disposed on an upstream side of the small compressor chamber in the intake passage. A large turbo axis as an axis of the large turbine shaft and a small turbo axis as an axis of the small turbine shaft are disposed to extend generally in a same direction as the engine output axis. The large turbo unit is disposed with respect to the engine body in such a manner that the large turbo axis is non-parallel to the engine output axis, and a portion of the large turbo axis on a side of the large compressor chamber is closer to the engine output axis than a portion of the large turbo axis on a side of the large turbine chamber in a plan view in an axis direction of the cylinder.

These and other objects, features and advantages of the present invention will become more apparent upon reading the following detailed description along with the accompanying drawings.

BRIEF DESCRIPTION OF DRAWINGS

FIG. 2 is a partially cutaway perspective view illustrating a turbocharger in the engine;

FIG. 11 is a sectional view taken along the line XI-XI in FIG. 9;

FIG. 12 is a schematic diagram illustrating a layout of a turbocharger as a comparative example;

FIG. 13 is a schematic diagram illustrating a layout of the turbocharger in the embodiment; and FIG. 14 is a side view of the turbocharger in the embodiment when viewed from the side of a compressor.

DESCRIPTION OF EMBODIMENTS

Schematic Configuration of Engine

Figure 1:
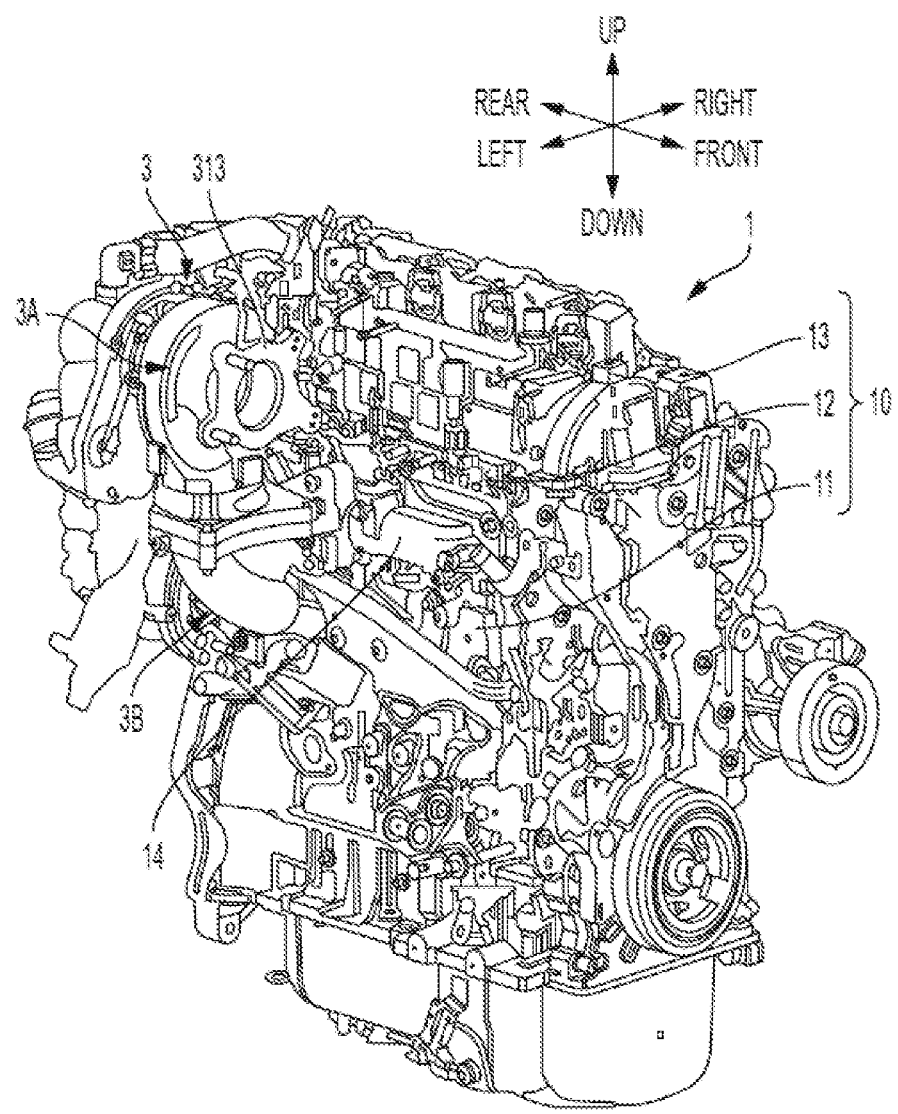
FIG. 1 is a perspective view of a turbocharger engine according to an embodiment of the present invention.

In the following, a turbocharger engine according to an embodiment of the present invention is described in detail based on the drawings. First of all, a schematic configuration of the engine is described. FIG. 1 is a perspective view of a turbocharger engine 1 according to the embodiment of the present invention. FIG. 2 is a partially cutaway perspective view illustrating a turbocharger 3 in the engine 1. In FIG. 1, FIG. 2, and the other drawings, a front direction, a rear direction, a left direction, a right direction, an upper direction, and a lower direction are indicated. This is for the sake of explanation, and does not necessarily indicate actual directions.

The turbocharger engine 1 includes a multi-cylinder engine body 10, an exhaust manifold 14 connected to a left surface of the engine body 10, an intake manifold 18 (see FIG. 8), and the turbocharger 3 disposed adjacent to the left side of the engine body 10. Although illustration is omitted in FIG. 1, the periphery of the exhaust manifold 14 is surrounded by a manifold insulator 15, the left surface of the engine body 10 is covered with an engine body insulator 16, and the periphery of the turbocharger 3 is covered with a turbo insulator 17.

The engine body 10 is an in-line 4-cylinder diesel engine. The engine body 10 includes a cylinder block 11, a cylinder head 12 mounted on an upper surface of the cylinder block 11, and a cylinder head cover 13 disposed above the cylinder head 12. The cylinder block 11 includes four cylinders 2 (see FIG. 5 and FIG. 11), each of which constitutes a fuel combustion chamber.

The exhaust manifold 14 internally includes a manifold passage configured to collect exhaust gas to be discharged from an exhaust port 25 of each cylinder 2 in one flow channel. A portion of the exhaust manifold 14 on the inlet side is connected to the cylinder head 12, and a portion of the exhaust manifold 14 on the outlet side is connected to the turbocharger 3. The intake manifold 18 internally includes a manifold passage for supplying intake air to an intake port 24 of each cylinder 2 from one intake passage.

The turbocharger 3 is a device disposed adjacent to a rear left side portion of the engine body 10, and configured to supercharge intake air to be introduced to the engine body 10 by using exhaust energy to be discharged from the engine body 10. The turbocharger 3 includes a large turbo unit 3A configured to supercharge intake air when the engine body 10 is operated in all the speed ranges, and a small turbo unit 3B configured to supercharge intake air when the engine body 10 is mainly operated in a low speed range. In the embodiment, the small turbo unit 3B is continuously extended from the large turbo unit 3A at a position below the large turbo unit 3A. Each of the large turbo unit 3A and the small turbo unit 3B includes a turbine chamber disposed on the front side, and a compressor chamber disposed on the rear side. An exhaust passage through which exhaust air is supplied from the engine body 10 via the turbine chambers, and an intake passage through which intake air to be supplied to the engine body 10 flows via the compressor chambers are formed in the turbocharger 3. In other words, the turbine chambers are disposed in an exhaust path of the engine body 10, and the compressor chambers are disposed in an intake path of the engine body 10.

The manifold insulator 15 is an insulator configured to insulate peripheral components from heat generated in the exhaust manifold 14 through which high-temperature exhaust air flows. The engine body insulator 16 protects the cylinder head cover 13, a harness, and sensors from heat generated in the exhaust manifold 14 and the turbocharger 3. The turbo insulator 17 is an insulator configured to cover the periphery of the turbine chambers of the turbocharger 3 through which high-temperature exhaust air flows to insulate peripheral components from heat.

External Configuration of Turbocharger

Figure 3:
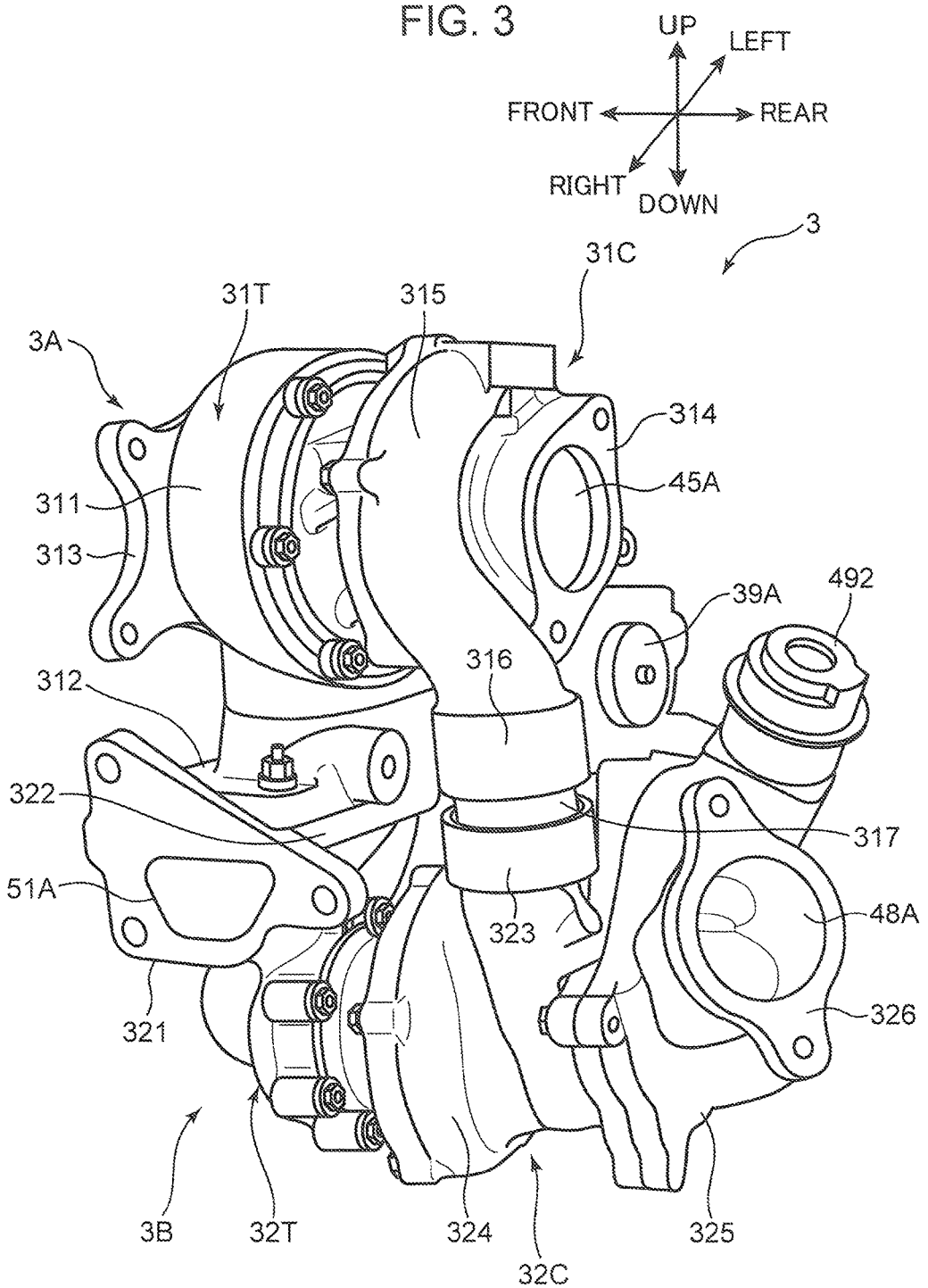
FIG. 3 is a perspective view of the turbocharger.
Figure 4:
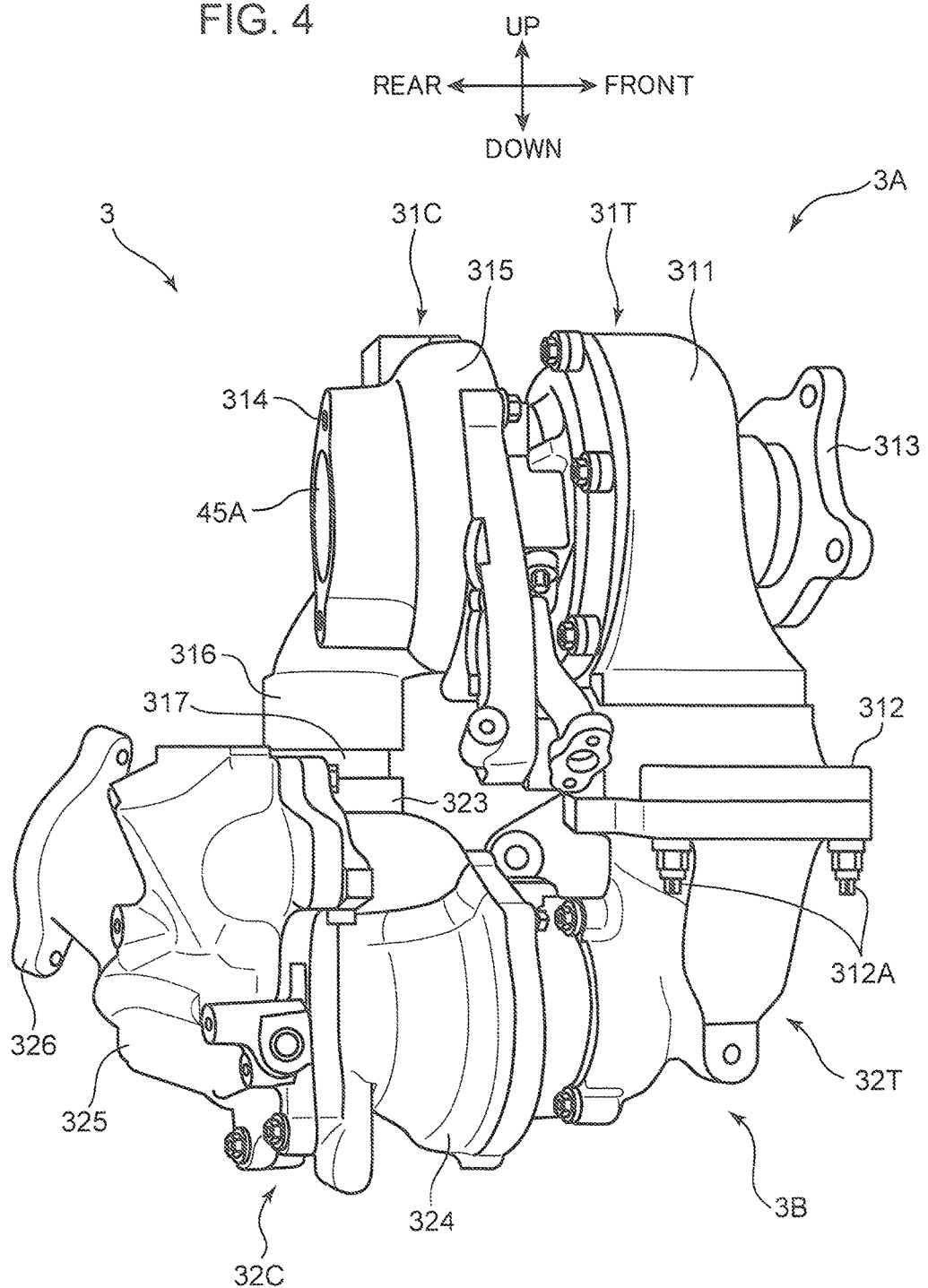
FIG. 4 is a side view of the turbocharger.

FIG. 3 is a perspective view of the turbocharger 3, and FIG. 4 is a side view of the turbocharger 3. The large turbo unit 3A includes a large turbine case 31T disposed on the front side, and a large compressor case 31C disposed on the rear side. Likewise, the small turbo unit 3B includes a small turbine case 32T disposed on the front side, and a small compressor case 32C disposed on the rear side. The small turbine case 32T is disposed below the large turbine case 31T, and the small compressor case 32C is disposed below the large compressor case 31C.

The large turbine case 31T defines a large turbine chamber 33 (see FIG. 5) communicating with an exhaust passage. The large turbine case 31T includes a sheet metal housing 311 constituted by a sheet metal case, an upper flange portion 312 configured to support a lower end of the sheet metal housing 311, and an exhaust flange portion 313 provided with an exhaust port as an exhaust outlet from the turbocharger 3. The exhaust flange portion 313 is connected to a downstream pipe of an exhaust passage.

The small turbine case 32T defines a small turbine chamber 35 (see FIG. 5) communicating with an exhaust passage. The small turbine case 32T is a housing constituted by a cast iron case. The small turbine case 32T includes an exhaust inlet flange portion 321 is integrally formed on an upstream portion of the exhaust passage, and a lower flange portion 322 is integrally formed on a downstream portion of the exhaust passage. The exhaust inlet flange portion 321 is a flange portion configured to connect the small turbine case 32T and the exhaust manifold 14. An exhaust inlet port 51A as an exhaust inlet to the turbocharger 3 is formed in the exhaust inlet flange portion 321. The lower flange portion 322 is a flange portion configured to connect the small turbine case 32T and the large turbine case 31T.

A flange stud 312A is formed to project downwardly from a lower surface of the upper flange portion 312 of the large turbine case 31T. On the other hand, a through-hole for receiving the flange stud 312A is formed in the lower flange portion 322 of the small turbine case 32T. The large turbine case 31T and the small turbine case 32T (the large turbo unit 3A and the small turbo unit 3B) are assembled into a unit by placing the upper flange portion 312 on the lower flange portion 322, and by engaging the upper flange portion 312 and the lower flange portion 322 with each other by a bolt with use of the flange stud 312A.

The large compressor case 31C defines a large compressor chamber 34 (see FIG. 5) communicating with an intake passage. The large compressor case 31C is an aluminum case, for instance, and includes an air intake passage flange portion 314, a large scroll portion 315, and a first coupling portion 316. The air intake passage flange portion 314 is a flange portion including an air intake passage port 45A as an air intake passage to the turbocharger 3. The large scroll portion 315 is a portion forming a part of the large compressor chamber 34, and forming a spiral intake passage around a large compressor 34B (see FIG. 5). The first coupling portion 316 is a cylindrical portion located at a downstream end of the large scroll portion 315 and having an inner diameter larger than the diameter of an upstream portion of the large scroll portion 315. The first coupling portion 316 is opened downwardly, and serves as an outlet from the large compressor case 31C.

The small compressor case 32C defines a small compressor chamber 36 (see FIG. 5) communicating with an intake passage. The large compressor chamber 34 is disposed on the upstream side of the small compressor chamber 36 in the intake passage. The small compressor case 32C is an aluminum case, for instance, and includes a second coupling portion 323, a small scroll portion 324, a downstream housing 325, and an outlet flange portion 326.

The second coupling portion 323 is a cylindrical portion serving as an air intake passage to the small compressor case 32C, and is opened upwardly. The second coupling portion 323 is a cylindrical member having the same inner diameter as the first coupling portion 316. The first coupling portion 316 and the second coupling portion 323 are disposed in such a manner that openings thereof face each other in an up-down direction. A downstream portion of the second coupling portion 323 communicates with an inlet of the small compressor chamber 36.

A coupling pipe 317 constituted by a cylindrical pipe is interposed between the first coupling, portion 316 and the second coupling portion 323. The coupling pipe 317 is a coupling pipe including a seal layer made of fluorine-containing rubber or the like on an outer peripheral surface of a flexible cylindrical pipe. An upper end of the coupling pipe 317 is air-tightly placed in the first coupling portion 316, a lower end thereof is air-tightly placed in the second coupling portion 323, and an intermediate portion thereof is exposed to the outside.

Figure 5:
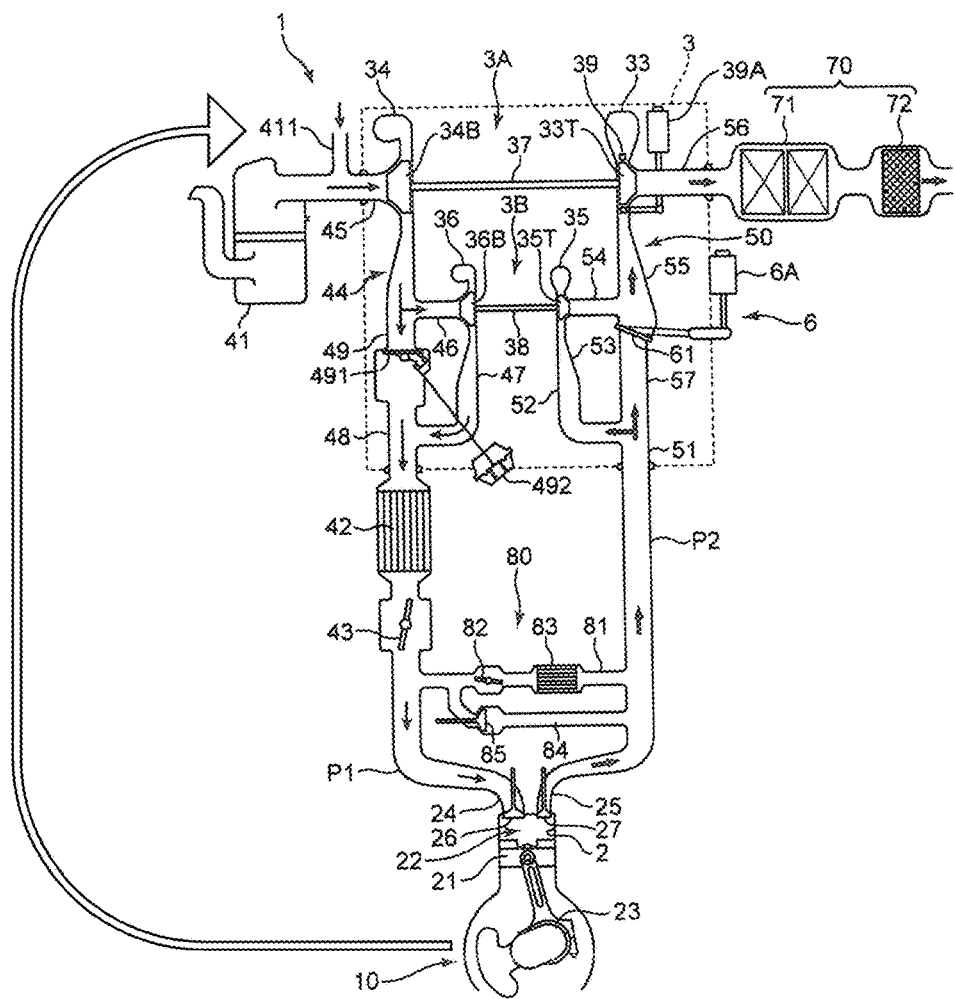
FIG. 5 is a diagram schematically illustrating a configuration of the turbocharger engine and peripheral components thereof, and a flow of intake air and a flow of exhaust air.

The small scroll portion 324 is a portion forming a part of the small compressor chamber 36, and forming a spiral intake passage around a small compressor 36B (see FIG. 5). The downstream housing 325 forms an intake passage on the downstream side of the small scroll portion 324, and an intake passage (an intake bypass passage 49) configured to bypass the small compressor chamber 36. The outlet flange portion 326 is a flange portion including an outlet port 48A as an outlet to the turbocharger 3.

A method for assembling the turbocharger 3 is described. First of all, the large turbo unit 3A and the small turbo unit 3B are individually assembled. In other words, the large turbo unit 3A is manufactured by integrally assembling the large turbine case 31T and the large compressor case 31C, and the small turbo unit 3B is manufactured by integrally assembling the small turbine case 32T and the small compressor case 32C. Subsequently, the large turbo unit 3A is mounted on the small turbo unit 3B. In this case, the coupling pipe 317 is placed in advance in the second coupling portion 323. Further, the large turbo unit 3A is mounted on the small turbo unit 3B by inserting the flange stud 312A projecting from the upper flange portion 312 into the through-hole of the lower flange portion 322 while mounting the first coupling portion 316 in the coupling pipe 317. Thereafter, the large turbo unit 3A and the small turbo unit 3B are engaged with each other by a bolt or a like member.

The aforementioned assembling method provides good working efficiency. Reducing a resistance against a flow of intake air through an intake passage while securing the assembling performance is a task to be attained. In other words, it is desirable to design an intake passage within the turbocharger 3 in such a manner that an intake resistance (a pressure loss) is reduced as much as possible in an assembling condition such that the flange stud 312A and the coupling pipe 317 are mounted at the same time. As will be described later in detail, the turbocharger 3 of the embodiment meets the aforementioned demand.

Internal Configuration of Engine

FIG. 5 is a diagram schematically illustrating a configuration of the turbocharger engine 1 and peripheral components thereof, and a flow of intake air and a flow of exhaust air. The engine 1 includes the engine body 10, an intake passage P1 for introducing combustion air to the engine body 10, an exhaust passage P2 for discharging combustion gas (exhaust air) generated in the engine body 10, the turbocharger 3 provided with passages constituting a part of the intake passage P1 and a part of the exhaust passage P2, an exhaust purification device 70 disposed near a downstream end of the exhaust passage P2, and an EGR (Exhaust Gas Recirculation) device 80 disposed between the intake passage P1 and the exhaust passage P2.

A piston 21, a combustion chamber 22, a crankshaft 23, the intake port 24, the exhaust port 25, an intake valve 26, and an exhaust valve 27 are provided in each cylinder 2 of the engine body 10. FIG. 5 illustrates one cylinder 2. The piston 21 is accommodated in the cylinder 2 to be reciprocally movable. The combustion chamber 22 is formed above the piston 21 within the cylinder 2. Diesel fuel is injected from an unillustrated injector into the combustion chamber 22. Fuel injected from the injector is mixed with air to be supplied from the intake passage P1, and the fuel-air mixture ignites itself within the combustion chamber 22. The piston 21 is reciprocally moved up and down while being pushed down by an expansion force generated by the combustion.

The crankshaft 23 is an output shaft of the engine body 10, and is disposed below the piston 21. The piston 21 and the crankshaft 23 are connected to each other via a connecting rod. The crankshaft 23 is rotated around an axis thereof in response to reciprocal motion of the piston 21. The intake port 24 is an opening for introducing air (intake air) to be supplied from the intake passage P1 into the cylinder 2. The exhaust port 25 is an opening for discharging exhaust air generated by combustion of fuel within the cylinder 2 to the exhaust passage P2. The intake valve 26 is a valve configured to open and close the intake port 24, and the exhaust valve 27 is a valve configured to open and close the exhaust port 25.

An air cleaner 41, a compressor portion (the large compressor chamber 34 and the small compressor chamber 36) of the turbocharger 3, an intercooler 42, and a throttle valve 43 are provided in this order in the intake passage P1 from the upstream side of a flow of intake air. A downstream end of the intake passage P1 is connected to the intake port 24 via the intake manifold 18 (see FIG. 8). The air cleaner 41 purifies air to be introduced to the intake passage P1. The intercooler 42 cools intake air to be fed to the combustion chamber 22 through the intake port 24. The throttle valve 43 is a valve configured to adjust the amount of intake air to be fed to the combustion chamber 22. Note that a blow-by recirculation passage 411 for feeding blow-by gas to the combustion chamber 22 is connected to an upstream portion of the turbocharger 3 in the intake passage P1. Intake air is supercharged while passing through the compressor portion of the turbocharger 3 to be described later in detail.

An upstream end of the exhaust passage P2 is connected to the exhaust port 25 via the exhaust manifold 14. A turbine portion (the small turbine chamber 35 and the large turbine chamber 33) of the turbocharger 3, and the exhaust purification device 70 are provided in this order in the exhaust passage P2 from the upstream, side of a flow of exhaust air. The exhaust purification device 70 is constituted by a catalyst device 71 including an NOx adsorption/reduction catalyst configured to temporarily adsorb NOx in exhaust air, and to reduce thereafter, and a DPF (Diesel Particulate Filter) 72 configured to trap particulate matter within exhaust air. Kinetic energy from exhaust air is recycled when the exhaust air passes through the turbine portion of the turbocharger 3.

The EGR device 80 is a device configured to recirculate a part of exhaust air (EGR gas) discharged from the engine body 10 to intake air. The EGR device 80 includes a first EGR passage 81 and a second EGR passage 84 communicating with the exhaust passage P2 and the intake passage P1 respectively, and a first EGR valve 82 and a second EGR valve 85 configured to open and close the first EGR passage 81 and the second EGR passage 84, respectively. An EGR cooler 83 is provided in the first EGR passage 81. EGR gas is cooled by the EGR cooler 83 while passing through the first EGR passage 81. Thereafter, the cooled EGR gas flows into the intake passage P1. On the other hand, an EGR cooler is not provided in the second EGR passage 84, and EGR gas is allowed to flow into the intake passage P1 while keeping a high-temperature state thereof. The first EGR passage 81 and the second EGR passage 84 communicate between an upstream portion of the exhaust passage P2 with respect to the turbocharger 3, and a downstream portion of the intake passage P1 with respect to the throttle valve 43. According to the aforementioned configuration, exhaust air before being introduced to the turbine portion of the turbocharger 3 is supplied to the intake port 24 together with intake air.

Details of Turbocharger

Next, a detailed structure of the turbocharger 3 according to the embodiment is described with reference to FIG. 3 to FIG. 5. As described above, the turbocharger 3 includes the large turbo unit 3A for use when the engine is operated in an intermediate speed range to a high speed range, and the small turbo unit 3B for use when the engine is operated in a low speed range. The large turbo unit 3A includes the large turbine chamber 33 and the large compressor chamber 34. Likewise, the small turbo unit 3B includes the small turbine chamber 35 and the small compressor chamber 36. The large turbine chamber 33 and the small turbine chamber 35 communicate with the exhaust passage P2, and the large compressor chamber 34 and the small compressor chamber 36 communicate with the intake passage P1.

A large turbine 33T is accommodated in the large turbine chamber 33, and the large compressor 34B is accommodated in the large compressor chamber 34. The large turbine 33T and the large compressor 34B are connected by a large turbine shaft 37. The large turbine shaft 37 extends between the large turbine chamber 33 and the large compressor chamber 34. The large turbine 33T is attached to an end of the large turbine shaft 37, and the large compressor 34B is attached to the other end thereof. The large turbine 33T is rotated around an axis of the large turbine shaft 37 by receiving kinetic energy from exhaust air. Likewise, the large compressor 34B is rotated around the axis of the large turbine shaft 37 to compress (supercharge) intake air. When the large turbine 33T is rotated by receiving kinetic energy from exhaust air, the large compressor 34B is also rotated with the large turbine 33T around the axis of the large turbine shaft 37.

As the large turbine 33T, it is possible to use an impeller including a plurality of vanes, and configured to rotate around the axis of the large turbine shaft 37 when exhaust air impinges on the vanes. The large turbine 33T is a so-called VGT (Variable Geometry Turbocharger) turbine, in which a variable vane mechanism 39 capable of changing the flow rate of exhaust air (a turbine capacity) is provided. The variable vane mechanism 39 is disposed on the outer periphery of the large turbine 33T, and includes a plurality of nozzle vanes whose angle is variable. By adjusting the angle of the nozzle vanes, the flow area of exhaust air flowing to the large turbine 33T is changed. Thus, the flow rate of exhaust air is adjusted. The angle of the nozzle vanes is adjusted by a VGT actuator 39A. It is necessary to increase the size of the large turbine chamber 33 (the large turbine case 31T) by the amount corresponding to installation of the variable vane mechanism 39.

A small turbine 35T is accommodated in the small turbine chamber 35, and the small compressor 36B is accommodated in the small compressor chamber 36. The small turbine 35T and the small compressor 36B are connected by a small turbine shaft 38. The small turbine shaft 38 extends between the small turbine chamber 35 and the small compressor chamber 36. The small turbine 35T is attached to an end of the small turbine shaft 38, and the small compressor 36B is attached to the other end thereof. The small turbine 35T is rotated around an axis of the small turbine shaft 38 by receiving kinetic energy from exhaust air. Likewise, the small compressor 36B is rotated around the axis of the small turbine shaft 38 to compress (supercharge) intake air. When the small turbine 35T is rotated by receiving kinetic energy from exhaust air, the small compressor 36B is also rotated with the small turbine 35T around the axis of the small turbine shaft 38. In the embodiment, a so-called FGT (Fixed Geometry Turbocharger) turbine incapable of changing the flow rate of exhaust air flowing to the small turbine 35T is used as the small turbine 35T.

The capacity of the large turbine 33T is set larger than the capacity of the small turbine 35T, and the capacity of the large compressor 34B is set larger than the capacity of the small compressor 36B. According to this configuration, the large turbo unit 3A is operable to rotate the large turbine 33T by exhaust air having a larger flow rate, as compared with the small turbo unit 3B, and is operable to supercharge intake air having a larger flow rate by rotation of the large compressor 34B.

The turbocharger 3 internally includes a supercharger intake passage 44 as a passage forming a part of the intake passage P1. The supercharger intake passage 44 includes an air intake passage 45, an intra-compressor passage 46, a downstream passage 47, an outlet passage 48, and the intake bypass passage 49. The air intake passage 45 is a most-upstream intake passage within the turbocharger 3, and is a passage extending toward the large compressor 34B in the large compressor chamber 34 in the axis direction of the large turbine shaft 37. The intra-compressor passage 46 is a passage configured to guide intake air from a scroll portion (the large scroll portion 315) on the outer periphery of the large compressor 34B toward the axis of the small compressor 36B in the small compressor chamber 36. The first coupling portion 316, the second coupling portion 323, and the coupling pipe 317 constitute a part of the intra-compressor passage 46.

The downstream passage 47 is a passage extending from a scroll portion (the small scroll portion 324) on the outer periphery of the small compressor 36B toward the outlet passage 48. The outlet passage 48 is a most-downstream intake passage within the turbocharger 3, and is a passage to be connected to the intercooler 42. In this way, the large compressor 34B is disposed on the upstream side of the small compressor 36B with respect to a flow of intake air.

The intake bypass passage 49 is a passage configured to bypass the small compressor chamber 36B, in other words, a passage configured to guide intake air downstream without supplying intake air to the small compressor 36B. Specifically, the intake bypass passage 49 is branched from a midpoint on the intra-compressor passage 46, which is configured to connect between the large compressor chamber 34 and the small compressor chamber 36, and joins the outlet passage 48 together with the downstream passage 47. An intake bypass valve 491 configured to open and close the intake bypass passage 49 is disposed in the intake bypass passage 49. The downstream housing 325 is a housing configured to mainly define the downstream passage 47 and the intake bypass passage 49.

In a state that the intake bypass valve 491 is fully closed and the intake bypass passage 49 is closed, the total amount of intake air flows into the small compressor chamber 36. On the other hand, in a state that the intake bypass valve 491 is opened, a large amount of intake air bypasses the small compressor chamber 36, and flows downstream through the intake bypass passage 49. Specifically, the small compressor 36B accommodated in the small compressor chamber 36 serves as a resistance against a flow of intake air. Therefore, in a state that the intake bypass valve 491 is opened, a large amount of intake air flows into the intake bypass passage 49 where the resistance is smaller than the intra-compressor passage 46. The intake bypass valve 491 is opened and closed by a valve actuator 492 of a negative pressure type.

The turbocharger 3 internally includes a supercharger exhaust passage 50 as a passage forming a part of the exhaust passage P2. The supercharger exhaust passage 50 includes an exhaust inlet, passage 51, a communication passage 52, a small scroll passage 53, an intra-turbo passage 54, a large scroll passage 55, an exhaust passage 56, and an exhaust bypass passage 57. The exhaust inlet passage 51, the communication passage 52, and the small scroll passage 53 are passages formed within the small turbine case 32T. The large scroll passage 55 and the exhaust passage 56 are passages formed within the large turbine case 31T. The intra-turbo passage 54 and the exhaust bypass passage 57 are passages spanning between the large turbine case 31T and the small turbine case 32T. In the embodiment, the small turbine 35T (specifically, the small turbine chamber 35) is disposed on the upstream side of the large turbine chamber 33T (specifically, the large turbine chamber 33) in the exhaust passage P2.

The exhaust inlet passage 51 is a most-upstream exhaust passage within the turbocharger 3, and is a passage configured to receive exhaust air from the side of the engine body 10. The communication passage 52 is a passage communicating with a downstream portion of the exhaust inlet passage 51, and configured to guide exhaust air toward the small turbine chamber 35. The small scroll passage 53 is a passage forming a part of the small turbine chamber 35, and configured to guide exhaust air toward the small turbine 35T. A downstream end of the communication passage 52 communicates with an upstream portion of the small scroll passage 53. The small scroll passage 53 is a spiral passage disposed in such a manner as to circulate the outer periphery of the small turbine 35T. The small scroll passage 53 is configured such that the channel width thereof is gradually reduced downstream. Exhaust air flows from the small scroll passage 53 radially toward the center of the small turbine 35T to rotate the small turbine 35T around an axis of the small turbine shaft 38.

The intra-turbine passage 54 is a passage communicating between the small turbine 35T and an upstream portion of the large scroll passage 55. An upstream portion of the intra-turbine passage 54 is a portion extending from the small turbine chamber 35 in the axis direction of the small turbine 35T. A downstream portion of the intra-turbine passage 54 is a portion communicating with an upstream portion of the large scroll passage 55. Exhaust air flowing from the outer periphery of the small turbine 35T radially inwardly and subjected to expansion in the small turbine 35T flows out from the intra-turbine passage 54, and is directed to the large turbine 33T.

The large scroll passage 55 is a passage forming a part of the large turbine chamber 33, and configured to guide exhaust air toward the large turbine 33T. The large scroll passage 55 is a spiral passage disposed in such a manner as to circulate the outer periphery of the large turbine 33T. The large scroll passage 55 is configured such that the channel width thereof is gradually reduced downstream. Exhaust air flows from the large scroll passage 55 radially toward the center of the large turbine 33T to rotate the large turbine 33T around an axis of the large turbine shaft 37. The exhaust passage 56 is a most-downstream exhaust passage within the turbocharger 3, and extends from the large turbine chamber 33 in the axis direction of the large turbine 33T. Exhaust air flowing from the outer periphery of the large turbine 33T radially inwardly and subjected to expansion in the large turbine 33T flows out from the exhaust passage 56. A downstream end of the exhaust passage 56 is an opening formed in the exhaust flange portion 313, and is connected to an exhaust passage extending to the exhaust purification device 70 on the downstream side.

The exhaust bypass passage 57 is a passage configured to bypass the small turbine chamber 35, in other words, a passage configured to guide exhaust air downstream (to the large turbine 33T) without supplying exhaust air to the small turbine 35T. Specifically, the exhaust bypass passage 57 is branched from a portion where the exhaust inlet passage 51 and the communication passage 52 are merged, and joins an upstream portion of the large scroll passage 55 to bypass the small scroll passage 53 and the intra-turbo passage 54. An exhaust bypass valve 6 configured to open and close the exhaust bypass passage 57 is disposed in the exhaust bypass passage 57. The exhaust bypass valve 6 includes a valve body 61 configured to actually open and close the exhaust bypass passage 57, and a valve actuator 6A configured to activate the valve body 61.

In a state that the exhaust bypass valve 6 (the valve body 61) is fully closed and the exhaust bypass passage 57 is closed, the total amount of exhaust air flows into the small turbine chamber 35. Note that when the EGR device 80 is activated, and recirculation of EGR gas is performed, the total amount of gas obtained by removing the EGR gas from exhaust air discharged from the engine body 10 flows into the small turbine chamber 35. On the other hand, in a state that the exhaust bypass valve 6 is opened, a large amount of exhaust air bypasses the small turbine chamber 35, and flows into the large turbine chamber 33 (the large scroll passage 55) on the downstream side. Specifically, the small turbine 35T accommodated in the small turbine chamber 35 becomes a resistance against a flow of exhaust air. Therefore, in a state that the exhaust bypass valve 6 is opened, a large amount of exhaust air flows into the exhaust bypass passage 57 where the resistance is smaller than the communication passage 52. In other words, exhaust air flows downstream without passing the small turbine 35T.

In other words, exhaust air always passes the the large turbine 33T in the large turbine chamber 33, no matter whether or not the exhaust bypass valve 6 is opened or closed. Namely, it is possible to operate the large turbo unit 3A any time to supercharge intake air. This makes it possible to increase a supercharging pressure of intake air by the turbocharger 3, and to enhance energy efficiency of the entirety of an engine system.

Operation of Turbocharger

The turbocharger 3 supercharges intake air by cooperation of the small turbo unit 3B and the large turbo unit 3A in a low speed range of the engine body 10, and supercharges intake air by the large turbo unit 3A in an intermediate speed range to a high speed range of the engine body 10.

The exhaust bypass valve 6 is fully closed when the engine body 10 is operated in a low speed range, and exhaust air is supplied to the small turbine 35T through the communication passage 52 and the small scroll passage 53. The small turbine 35T has a small inertia. Therefore, even when the flow rate of exhaust air is small, the rotational speed of the small turbine 35T is increased in an early stage to enhance supercharging efficiency by the small compressor 36B. Thereafter, exhaust air passes through the intra-turbo passage 54 and the large scroll passage 55, and is supplied to the large turbine 33T. Specifically, in a low speed range, both of the large turbine 33T and the small turbine 35T are rotated, and the large compressor 34B and the small compressor 36B are also rotated. Thus, it is possible to supercharge intake air by operating both of the large turbo unit 3A and the small turbo unit 3B.

In this case, an opening angle of the variable vane mechanism 39 attached to the large turbine 33T is set to a small value. Specifically, an unillustrated control device causes the VGT actuator 39A to pivotally move the unillustrated nozzle vanes by a predetermined angle so as to reduce the flow area of exhaust air. This makes it possible to increase the flow rate of exhaust air flowing into the large turbine 33T, and to enhance supercharging efficiency by the large compressor 34B in a low speed range of the engine body 10.

On the other hand, when the engine body 10 is operated in an intermediate speed range to a high speed range, the exhaust bypass valve 6 is fully opened, and exhaust air is mainly supplied to the large turbine 33T through the exhaust bypass passage 57. In other words, it is possible to supply exhaust air to the large turbine 33T while reducing a resistance against a flow of exhaust air as much as possible. This makes it possible to enhance energy efficiency. In this case, an opening angle of the nozzle vanes of the variable vane mechanism 39 is set to a reference vane angle for obtaining a predetermined supercharging pressure set in advance.

The valve actuator 6A is constituted by an electrically operated actuator device, and is operable not only to open and close the valve body 61, but also to adjust the opening angle of the valve body 61 from a fully closed state to a fully opened state. The opening angle of the valve body 61 is set in such a manner that the supercharging pressure reaches a target pressure for each operating condition. The target supercharging pressure and the opening angle of the valve body 61 are set in advance by an engine speed and an engine load. The valve actuator 6A controls the opening angle of the valve body 61 according to the set parameters.

Figure 6:
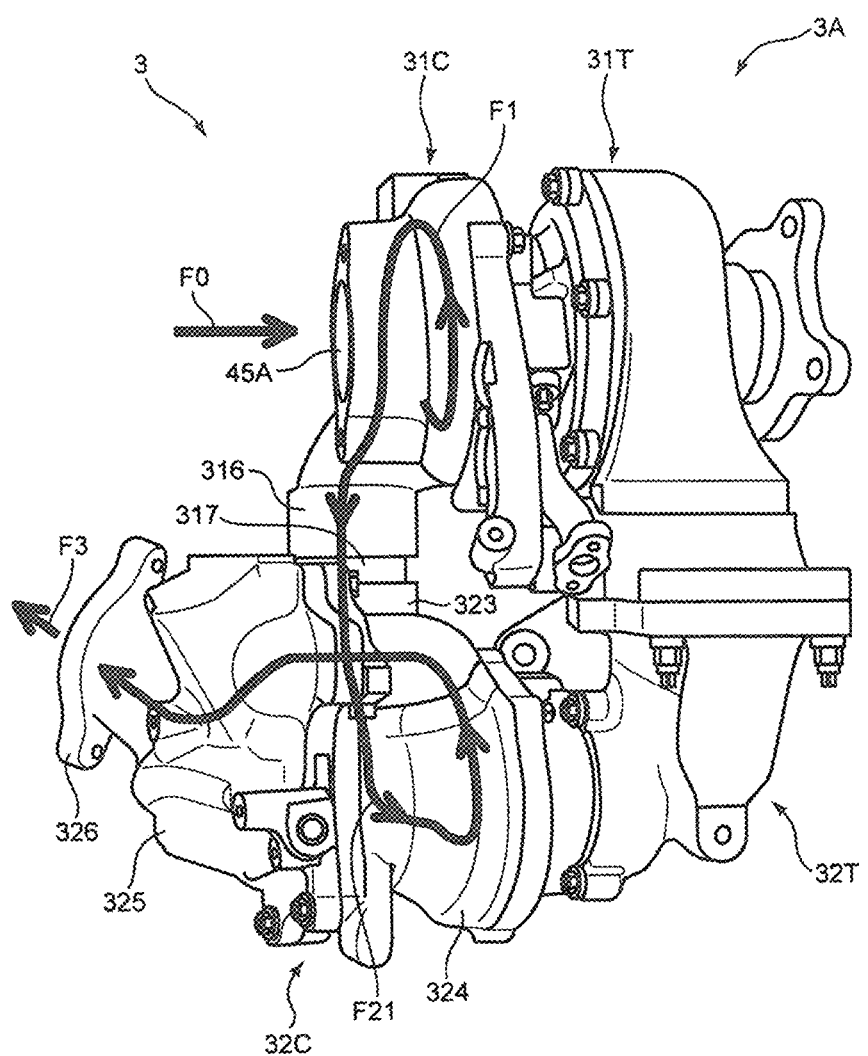
FIG. 6 is a side view of the turbocharger illustrating a flow of intake air in the turbocharger in a low speed range of an engine body.
Figure 7:
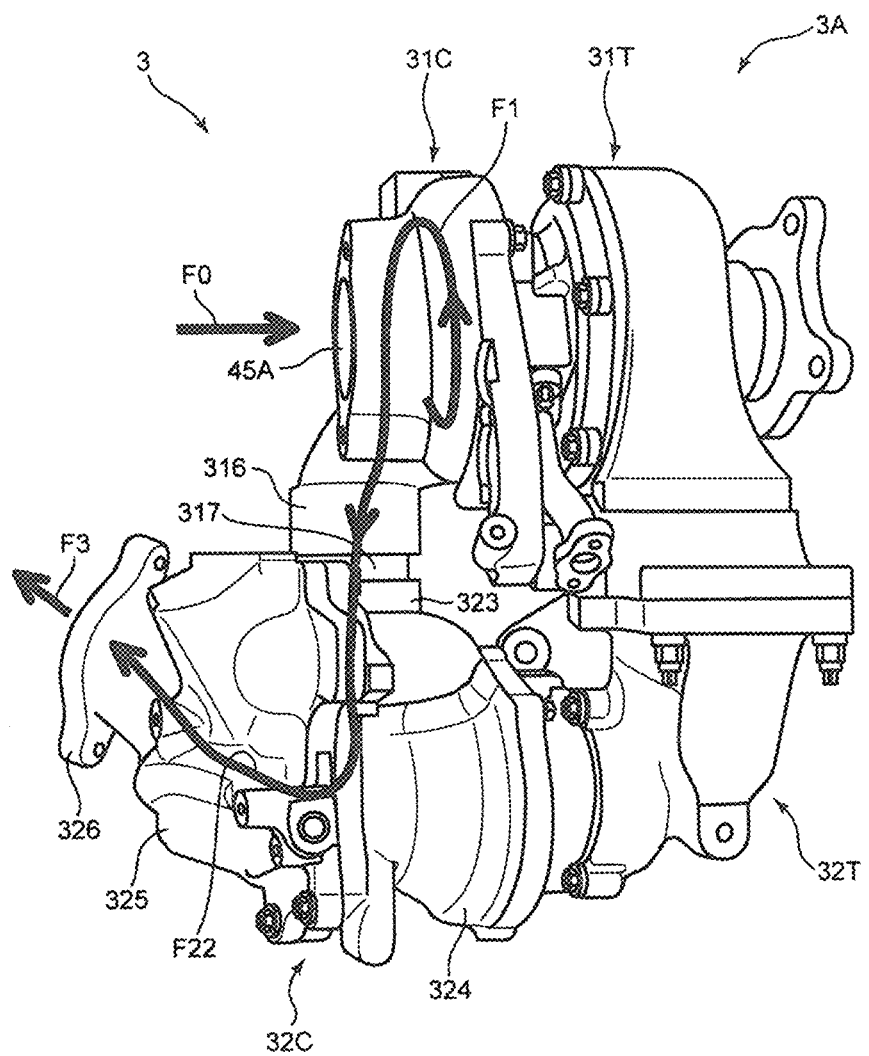
FIG. 7 is a side view of the turbocharger illustrating a flow of intake air in the turbocharger in an intermediate speed range to a high speed range of the engine body.

Next, a flow of intake air is described. FIG. 6 is a side view of the turbocharger 3 illustrating a flow of intake air in the turbocharger 3 in a low speed range of the engine body 10. FIG. 7 is a side view of the turbocharger 3 illustrating a flow of intake air in the turbocharger 3 in an intermediate speed range to a high speed range of the engine body 10. In a low speed range, as indicated by the arrow F0 in FIG. 6, intake air flows into the large compressor case 31C (the large compressor chamber 34) through the air intake passage port 45A. The intake flow direction in this case is a direction toward a rotational axis (the large turbine shaft 37) of the large compressor 34B.

When the large compressor 34B is rotated around an axis thereof in association with the large turbine 33T, intake air is supercharged. As indicated by the arrow F1, intake air scrolls around the outer periphery of the large compressor 34B in the large scroll portion 315, flows downwardly, and then, flows into the small compressor case 32C through the coupling pipe 317. Thereafter, as indicated by the arrow F21, intake air enters the small compressor chamber 36 toward the rotational axis (the small turbine shaft 38) of the small compressor 36B, and is supercharged by the small compressor 36B. Subsequently, intake air flows toward the downstream housing 325 via the small scroll portion 324 on the outer periphery of the small compressor 36B. Then, as indicated by the arrow F3, intake air passes through the outlet port 48A of the outlet flange portion 326, and is discharged to the outside of the turbocharger 3.

In an intermediate speed range to a high speed range, the intake bypass valve 491 is fully closed, and the intake bypass passage 49 is closed. Therefore, the intake flow path after intake air enters the small compressor chamber 36 is different from the intake flow path in a low speed range. Specifically, flow paths indicated by the arrow F0 and the arrow F1 in FIG. 7 are the same as those in FIG. 6. However, as indicated by the arrow F22 in FIG. 7, intake air after entering the small compressor case 32C is not directed to the small compressor chamber 36, but passes through the intake bypass passage 49 within the downstream housing 325. Further, as indicated by the arrow F3 in FIG. 7, intake air is discharged to the outside of the turbocharger 3 through the outlet port 48A.

Description on Layout of Turbo Axes

Figure 8:
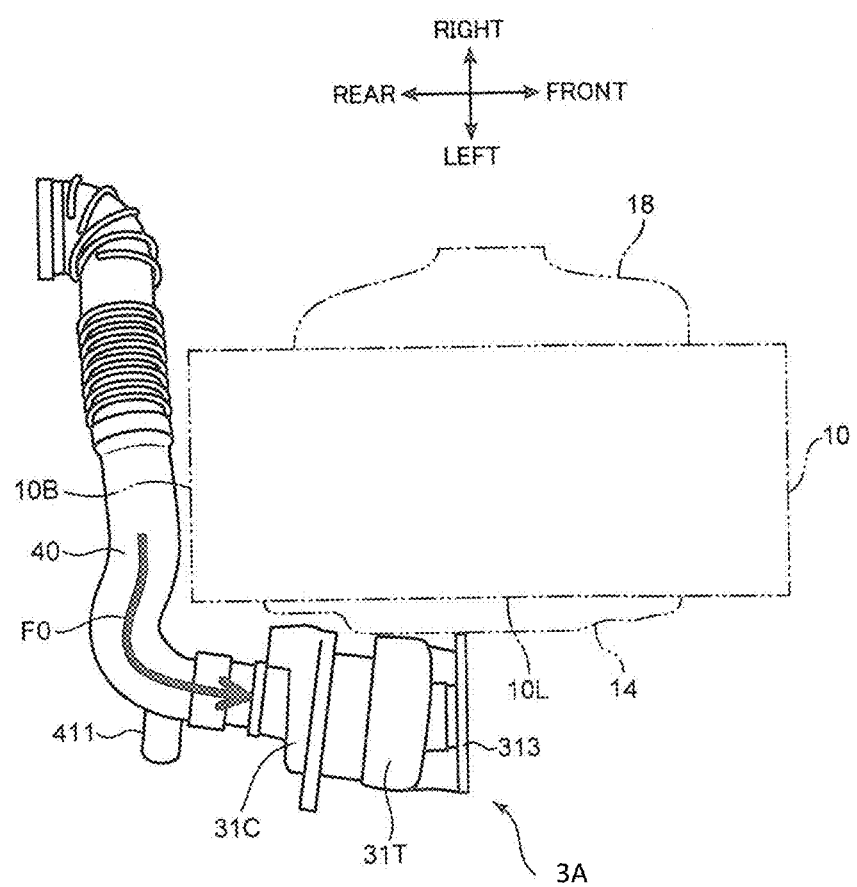
FIG. 8 is a top plan view of the engine.
Figure 9:
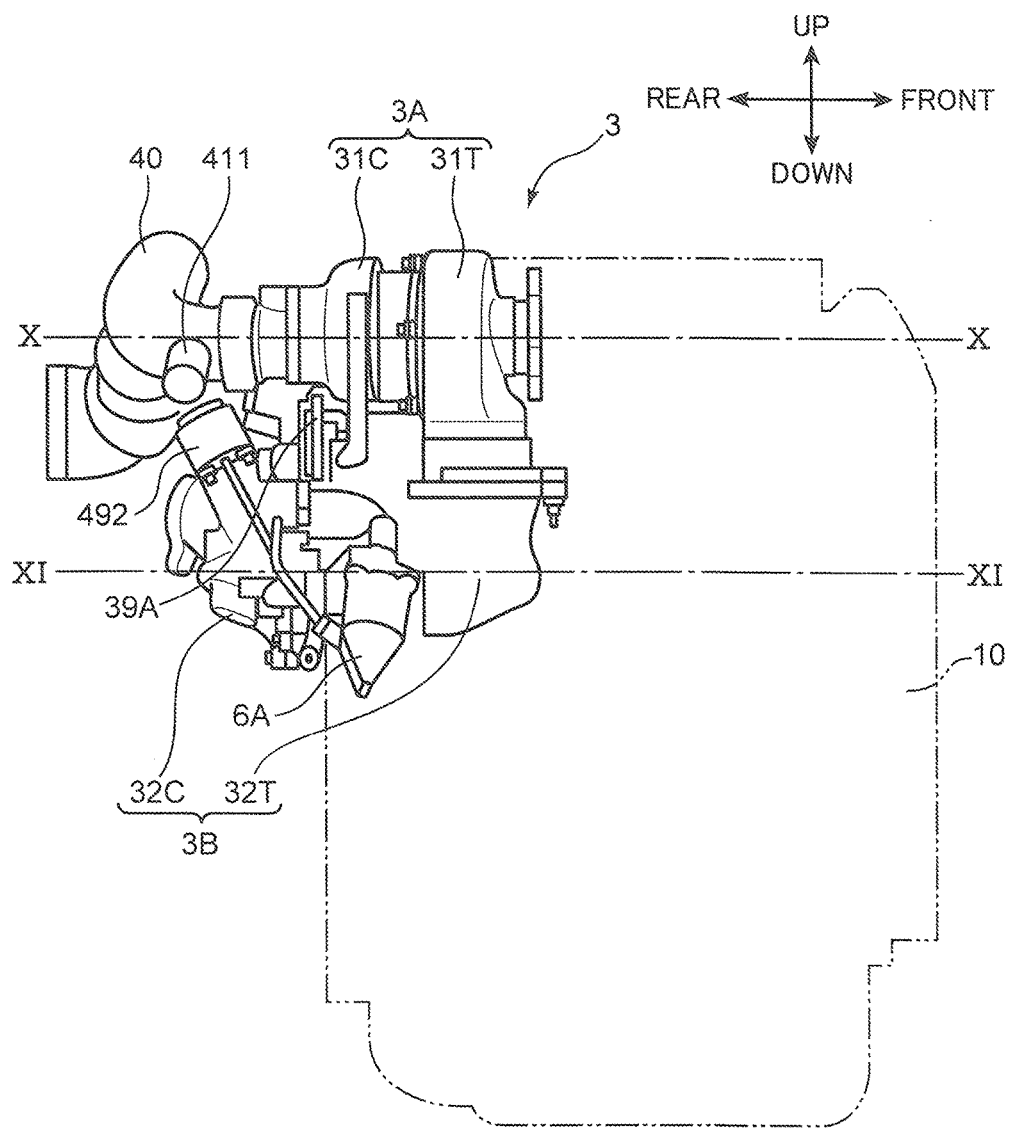
FIG. 9 is a side view of the engine.
Figure 10:
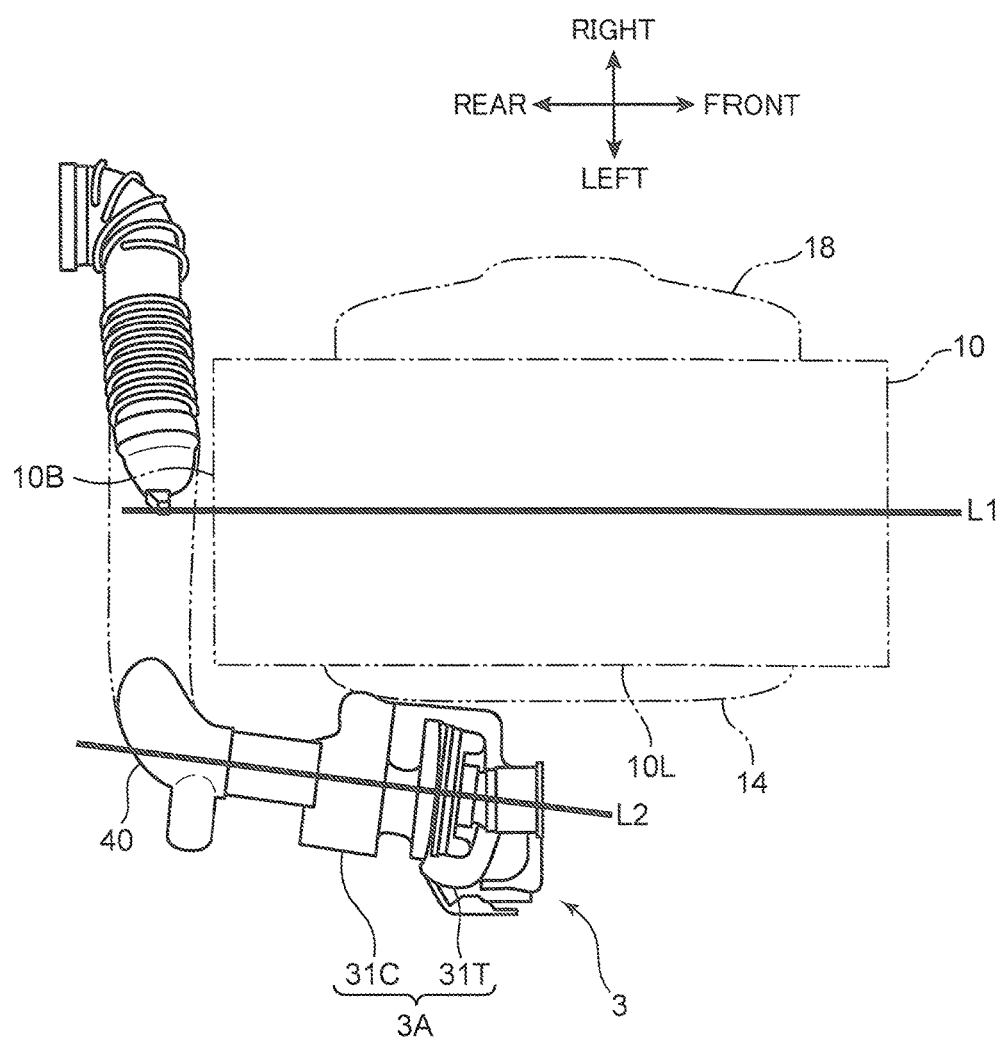
FIG. 10 is a sectional view taken along the line X-X in FIG. 9.

FIG. 8 is a top plan view of the turbocharger engine 1. FIG. 9 is a side view of the engine 1. FIG. 10 is a sectional view taken along the line X-X in FIG. 9. FIG. 11 is a sectional view taken along the line XI-XI in FIG. 9. As illustrated in FIG. 8, the large compressor case 31C of the turbocharger 3 is connected to an air intake passage pipe 40. The air intake passage pipe 40 is a pipe member configured to connect between the air cleaner 41 (see FIG. 5), and the air intake passage port 45A (see FIG. 3 and FIG. 4) formed in a rear end of the large compressor case 31C. The air intake passage pipe 40 extends from the right side to the left side along a periphery of a rear surface of the engine body 10. A downstream portion of the air intake passage pipe 40 is bent forwardly, and a most-downstream end of the air intake passage pipe 40 is connected to the air intake passage port 45A. As indicated by the arrow F0 in FIG. 8, intake air purified by the air cleaner 41 is supplied to the large compressor case 31C through the air intake passage pipe 40.

As illustrated in FIG. 11, the array direction of the four cylinders 2, which are arranged in series in the engine body 10, is aligned with a front-rear direction (a cylinder array direction) of the engine body 10. An engine output shaft (the crankshaft 23) also extends in a front-rear direction. FIG. 10 and FIG. 11 illustrate a straight line L1 (hereinafter, referred to as an engine output axis L1) corresponding to the extending direction of the engine output shaft. The engine body 10 has a generally rectangular shape with a long length in a front-rear direction in a top plan view (a plan view in the axis direction of the cylinder 2). The engine body 10 includes a rear surface 10B (a surface of the engine body 10 in the cylinder array direction) on the rear side, and a left surface 10L on the left side.

The turbocharger 3 is disposed adjacent to the left surface 10L of the engine body 10, near the rear surface 10B, and in the vicinity of an upper end (the cylinder head cover 13) of the engine body 10. According to this configuration, the large compressor case 31C including the large compressor chamber 34 is disposed near the rear surface 10B in the vicinity of an upper end of the left surface 10L. As described above, in the turbocharger 3, the large turbo unit 3A is disposed on the upper side, and the small turbo unit 3B is disposed on the lower side. The line X-X in FIG. 9 is a line segment passing through the large turbo unit 3A in a front-rear direction. FIG. 10 is a sectional view taken along the line segment. The line XI-XI in FIG. 9 is a line segment passing through the small turbo unit 3B in a front-rear direction. FIG. 11 is a sectional view taken along the line segment.

FIG. 10 illustrates a straight line L2 (an axis of a large turbine shaft) corresponding to the extending direction of the large turbine shaft 37, and FIG. 11 illustrates a straight line L3 (an axis of a small turbine shaft) corresponding to the extending direction of the small turbine shaft 38. Hereinafter, the straight line L2 is referred to as a large turbo axis L2, and the straight line L3 is referred to as a small turbo axis L3. The large turbo axis L2 and the small turbo axis L3 are not completely in parallel to the engine output axis L1, however, extends generally in a front-rear direction as well as the engine output axis L1.

The large turbo axis L2 is disposed non-parallel to the engine output axis L1, and a rear end of the large turbo axis L2 is close to the left surface 10L of the engine body 10 in a top plan view. Specifically, the large turbo axis L2 is disposed at such a position that a portion of the large turbo axis L2 on the side of the large compressor case 31C (the large compressor chamber 34) is closer to the engine output axis L1 than a portion of the large turbo axis L2 on the side of the large turbine case 31T (the large turbine chamber 33). The large turbo unit 3A is disposed with respect to the engine body 10 to have the aforementioned layout relationship with respect to the large turbo axis L2.

The small turbo axis L3 is disposed non-parallel to the engine output axis L1, and a front end of the small turbo axis L3 is close to the left surface 10L of the engine body 10 in a top plan view. Specifically, the small turbo axis L3 is disposed at such a position that a portion of the small turbo axis L3 on the side of the small turbine case 32T (the small turbine chamber 35) is closer to the engine output axis L1 than a portion of the small turbo axis L3 on the side of the small compressor case 32C (the small compressor chamber 36). The small turbo unit 3B is disposed with respect to the engine body 10 to have the aforementioned layout relationship with respect to the small turbo axis L3.

As illustrated in FIG. 11, the small turbo axis L3 is located between, the large turbo axis L2 and the engine output axis L1 in a top plan view. In other words, the small turbo axis L3 is disposed at a position closer to the engine output axis L1 than the large turbo axis L2. Further, the large turbo axis L2 and the small turbo axis L3 are inclined in directions opposite to each other with respect to the engine output axis L1. Therefore, when the large turbo axis L2 and the small turbo axis L3 are extended, a rear portion of the large turbo axis L2 and a rear portion of the small turbo axis L3 intersect with each other. In an actual turbocharger 3, the small turbo unit 3B is disposed with respect to the large turbo unit 3A in such a manner that an end of the small turbine shaft 38 on the side of the small compressor case 32C is closer to the large turbine shaft 37 than an end portion of the small turbo shaft 38 on the side of the small turbine case 32T in a top plan view.

Advantageous Effects

In the turbocharger engine 1 according to the embodiment described as above, the following advantageous effects are obtained. The turbocharger 3 in the turbocharger engine 1 is a dual stage turbocharger provided with the large turbo unit 3A for use when the engine is operated in an intermediate speed range to a high speed range, and the small turbo unit 3B for use when the engine is operated in a low speed range. In the supercharger intake passage 44, the large compressor chamber 34 of the large turbo unit 3A is disposed on the upstream side of the small compressor chamber 36 of the small turbo unit 3B. Further, the large turbo unit 3A and the small turbo unit 3B are disposed with respect to the engine body 10 in such a manner that the large turbo axis L2 and the small turbo axis L3 extend generally in a front-rear direction as well as the engine output axis L1.

In the turbocharger engine 1 having the aforementioned configuration, the large turbo unit 3A is disposed with respect to the engine body 10 in a state that the large turbo axis L2 is inclined with respect to the engine output axis L1 in such a manner that an end of the large turbo axis L2 on the side of the large compressor case 31C is close to the engine output axis L1. Further, the air intake passage pipe 40 (an upstream intake pipe) constituting an intake passage on the upstream side of the large compressor chamber 34 extends along the rear surface 10B of the engine body 10. When an inlet path of intake air is formed as described above, it is possible to set a degree of bending the intake inlet pipe 40 to an obtuse angle by the amount of inclination of the large turbo axis L2. This makes it possible to reduce an intake resistance against a flow of intake air into the large compressor chamber 34.

This point is described based on FIG. 12 and FIG. 13. FIG. 12 is a schematic top plan view illustrating a layout of a turbocharger 30 as a comparative example. FIG. 13 is a schematic top plan view illustrating a layout of the turbocharger 3 according to the embodiment. In the comparative example illustrated in FIG. 12, the turbocharger 30 is mounted on an engine body 10 in such a manner that a large turbo axis L20 and a small turbo axis L30 are in parallel to an engine output axis L1. In a conventional general dual stage turbocharger, the aforementioned layout on turbo axes is typically adopted.

In the comparative example illustrated in FIG. 12, it is necessary to set a degree of bending a downstream portion of an air intake passage pipe 400 for supplying intake air to the turbocharger 30 to an acute angle. In other words, in the comparative example, the large turbo axis L20 in alignment with an introducing direction of intake air is not inclined with respect to the engine output axis L1. Therefore, when the air intake passage pipe 400 extends along a rear surface 10B of an engine body 10 to connect a downstream end of the air intake passage pipe 400 to a large compressor case 31C of a large turbo unit 3A, it is necessary to bend a downstream portion of the air intake passage pipe 400 substantially at a right angle. As a result, intake air flowing through the air intake passage pipe 400 flows into the large turbo unit 3A along a path which is curved with a large curvature, as indicated by the arrow F01 in FIG. 12. This may increase an intake resistance.

On the other hand, in the layout of the turbocharger 3 according to the embodiment illustrated in FIG. 13, it is possible to set a degree of bending the air intake passage pipe 40 to a large value. Specifically, in the embodiment, the large turbo axis L2 is inclined with respect to the engine output axis L1. The inclination is an inclination such that the rear end of the large turbo axis L2 corresponding to an inlet port of intake air is close to the engine output axis L1, and a front end thereof is far from the engine output axis L1. Therefore, when the air intake passage pipe 40 extends along the rear surface 10B of the engine body 10 to connect a downstream end of the intake inlet pipe 40 to the large compressor case 31C of the large turbo unit 3A, it is possible to set a degree of bending a downstream portion of the air intake passage pipe 40 to a large value by the amount of inclination of the large turbo axis L2. This means, as illustrated by the arrow F0 in FIG. 13, it is possible to set a curvature of a path of intake air flowing through the air intake passage pipe 40 to a relatively small value. This contributes to reduction of an intake resistance. Thus, it is possible to improve supercharging efficiency of intake air by the large turbo unit 3A.

Further, as illustrated in FIG. 13, the small turbo unit 3B is disposed in such a manner that the small turbo axis L3 is located between the large turbo axis L2 and the engine output axis L1. Further, the small turbo unit 3B is disposed in such a manner that a rear end of the small turbo axis L3 is closest to the large turbo axis L2. The advantageous effects of the aforementioned layout relationship are described based on FIG. 14.

FIG. 14 is a side view of the turbocharger 3 according to the embodiment when viewed from the side of a compressor. In FIG. 14, as well as the description with reference to FIG. 6, the arrow F21 indicates a direction of intake air from the large compressor case 31C toward the small compressor case 32C. The intra-compressor passage 46 described with reference to FIG. 5 is an intake passage extending substantially linearly in an up-down direction, and constituted by a compressor inlet passage 327 communicating from a downstream portion of the large scroll portion 315 to the first coupling portion 316, the coupling pipe 317, the second coupling portion 323, and the small compressor chamber 36. The intra-compressor passage 46 having the aforementioned configuration is implemented by the layout of the large turbo axis L2 and the small turbo axis L3.

The small turbo axis L3 exists between the large turbo axis L2 and the engine output axis L1. Therefore, an opening (a downstream opening of the compressor inlet passage 327 facing the small compressor 36B) through which intake air is introduced to the small compressor chamber 36 is located between the center axis (the large turbo axis L2) of the large compressor chamber 34, and the left surface 10L of the engine body 10. Therefore, it is possible to form the intra-compressor passage 46 extending to the small compressor case 32C through the large scroll portion 315, which is scrolled counterclockwise in FIG. 14, into an intake passage of a short length and a small degree of bending. This makes it possible to reduce a resistance against a flow of intake air through the intra-compressor passage 46 as indicated by the arrow F21.

Further, a rear end of the small turbo axis L3 is disposed to be close to a rear end of the large turbo axis L2. This also makes it easy to form the intra-compressor passage 46 as an intake passage of a short length and a small degree of bending. In the embodiment, the variable vane mechanism 39 is disposed within the large turbine chamber 33. This may make the size of the large turbine case 31T relatively large. On the other hand, the small turbine 35T in the small turbine chamber 35 is an FGT turbine. Therefore, the size of the small turbine chamber 35 is not so large. In the aforementioned configuration, if the large turbo axis L2 and the small turbo axis L3 are in parallel to each other, the layout on the large turbo axis L2 and the small turbo axis L3 is such that the large turbo axis L2 and the small turbo axis L3 are largely far from each other in a left-right direction on a rear end of the turbocharger 3. In this case, the intra-compressor passage 46 may be a long passage having a curvature. On the other hand, in the embodiment, the large turbo axis L2 and the small turbo axis L3 are close to each other on a rear end of the turbocharger 3. This makes it possible to form the intra-compressor passage 46 as a passage extending generally vertically downwardly from a downstream end of the large scroll portion 315.

Setting the intra-compressor passage 46 having, the aforementioned configuration makes it possible to adopt an efficient manufacturing process, in which the large turbo unit 3A and the small turbo unit 3B are assembled to each other by inserting the flange stud 312A into the through-hole of the lower flange portion 322 while mounting the first coupling portion 316 in the coupling pipe 317, as described above based on FIG. 4.

Further, the large compressor case 31C configured to define the large compressor chamber 34 is disposed in the vicinity of the rear surface 10B of the engine body 10. According to the aforementioned layout, a degree of bending the air intake passage pipe 40 tends to be an acute angle. In particular, in the embodiment, the air intake passage pipe 40 extends along the rear surface 10B. This may require that the air intake passage pipe 40 should be connected to the large compressor case 31C immediately after a downstream portion of the air intake passage pipe 40 is bent forwardly. In view of the above, the aforementioned layout is appropriate for the inventive turbocharger engine 1 configured such that the large turbo axis L2 is set close to the engine output axis L1 with an inclination.

As described above, according to the present invention, in the engine 1 provided with the dual stage turbocharger 3 including the large turbo unit 3A and the small turbo unit 3B, it is possible to reduce a resistance against a flow of intake air in the supercharger intake passage 44 of the turbocharger 3. This is advantageous in reducing a pressure loss of intake air, and in improving supercharging efficiency of the turbocharger 3.

Description of Modifications

In the foregoing, an embodiment of the present invention is described. The present invention, however, is not limited to the above. For instance, FIG. 11 illustrates an example in which the small turbo axis L3 is inclined with respect to the engine output axis L1 in such a manner that a front end of the small turbo axis L3 is close to the engine output axis L1. Alternatively, a small turbo unit 3B may be disposed with respect to an engine body 10 in such a manner that a small turbo axis L3 is in parallel to an engine output axis L1. Further, in the embodiment, the variable vane mechanism 39 is disposed within the large turbine chamber 33. Alternatively, the large turbine 33T may also be art FGT turbine.

The aforementioned embodiment discloses a turbocharger engine having the following, configuration.

A turbocharger engine according to an aspect of the present invention includes an engine body provided with a cylinder, and an engine output axis; and a turbocharger disposed adjacent to the engine body, and including an exhaust passage through which exhaust air is supplied from the engine body, and an intake passage through which intake air is supplied to the engine body to supercharge the intake air. The turbocharger includes a large turbo unit provided with a large turbine chamber communicating with the exhaust passage and configured to accommodate a large turbine, a large compressor chamber communicating with the intake passage and configured to accommodate a large compressor, and a large turbine shaft extending between the large turbine chamber and the large compressor chamber to connect between the large turbine and the large compressor, the large turbo unit being mainly operated in an intermediate speed range to a high speed range of the engine body; and a small turbo unit provided with a small turbine chamber communicating with the exhaust passage and configured to accommodate a small turbine, a small compressor chamber communicating with the intake passage and configured to accommodate a small compressor, and a small turbine shaft extending between the small turbine chamber and the small compressor chamber to connect between the small turbine and the small compressor, the small turbo unit being mainly operated in a low speed range of the engine body. The large compressor chamber is disposed on an upstream side of the small compressor chamber in the intake passage. A large turbo axis as an axis of the large turbine shaft and a small turbo axis as an axis of the small turbine shaft are disposed to extend generally in a same direction as the engine output axis. The large turbo unit is disposed with respect to the engine body in such a manner that the large turbo axis is non-parallel to the engine output axis, and a portion of the large turbo axis on a side of the large compressor chamber is closer to the engine output axis than a portion of the large turbo axis on a side of the large turbine chamber in a plan view in an axis direction of the cylinder.

Note that the expression, in this specification, "the large turbo axis and the small turbo axis are exposed to extend in the same direction as the engine output axis" means not only precise "the same direction", but also generally "the same direction". For example, even if the large turbo axis and/or the small turbo axis include an inclination with respect to the engine output axis by about 10 to 20 degrees, it is in a category of "the same direction".

In the turbocharger engine having the aforementioned configuration, the large turbo unit is disposed in a state that the large turbo axis is inclined to allow a portion of the large turbo axis on the side of the large compressor chamber to come close to the engine output axis. Therefore, in a case where an upstream intake pipe constituting an intake passage on the upstream side of a large compressor chamber extends from the side of the engine body, it is possible to set a degree of bending the upstream intake pipe to an obtuse angle by the amount of inclination. This is advantageous in reducing an intake resistance against a flow of intake air into the large compressor chamber.

In the turbocharger engine having the aforementioned configuration, preferably, the small turbo unit may be disposed in such a manner that the small turbo axis is located between the large turbo axis and the engine output axis in the plan view.

In the turbocharger engine having the aforementioned configuration, an opening (an opening formed along the small turbo axis) through which intake air is introduced to the small compressor chamber is located between an axis of the large compressor chamber and a surface of the engine body in the plan view. Therefore, it is easy to form an intra-compressor intake passage extending from the large compressor chamber on the upstream side to the small compressor chamber on the downstream side in the intake passage as an intake passage of a short length and a small degree of bending. This is advantageous in reducing an intake resistance in the intra-compressor intake passage.

In the turbocharger engine having the aforementioned configuration, more preferably, the small turbo unit may be disposed in such a manner that a portion of the small turbo axis on a side of the small compressor chamber is closer to the large turbo axis than a portion of the small turbo axis on a side of the small turbine chamber in the plan view. This is more advantageous in forming the intra-compressor intake passage as an intake passage of a short length and a small degree of bending.

In the turbocharger engine having the aforementioned configuration, preferably, the engine body may include a plurality of the cylinders arranged in series, and the large compressor chamber may be disposed in a vicinity of a surface of the engine body in the cylinder array direction.

In a layout in which a large compressor chamber is disposed in the vicinity of a surface of an engine body in the cylinder array direction, a degree of bending the upstream intake pipe tends to be an acute angle. In particular, in a case where the upstream intake pipe extends along a surface of an engine body in the cylinder array direction, the upstream intake pipe is connected to a large compressor chamber immediately after the upstream intake pipe is bent at an acute angle. In view of the above, the aforementioned layout is appropriate for the inventive turbocharger engine, in which the large turbo axis is set close to the engine output axis with an inclination.

According to the present invention as described above, it is possible to provide a turbocharger engine provided with a turbocharger including a large turbo unit and a small turbo unit, which enables to reduce an intake resistance and to improve supercharging efficiency.

This application is based on Japanese Patent Application No. 2016-108957 filed on May 31, 2016, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:
1. A turbocharger engine, comprising:
an engine body including a cylinder and an engine output axis; and
a turbocharger disposed adjacent to the engine body, and including an exhaust passage through which exhaust gas is discharged from the engine body, and an intake passage through which intake air is supplied to the engine body to supercharge the intake air, wherein
the turbocharger includes
a large turbo unit provided with:
a large turbine chamber communicating with the exhaust passage and configured to accommodate a large turbine,
a large compressor chamber communicating with the intake passage and configured to accommodate a large compressor, and a large turbine shaft extending between the large turbine chamber and the large compressor chamber to connect between the large turbine and the large compressor, the large turbo unit being operated in an intermediate speed range to a high speed range of the engine body, a small turbo unit provided with:
  a small turbine chamber communicating with the exhaust passage and configured to accommodate a small turbine,
  a small compressor chamber communicating with the intake passage and configured to accommodate a small compressor, and
  a small turbine shaft extending between the small turbine chamber and the small compressor chamber to connect between the small turbine and the small compressor, the small turbo unit mainly operated in a low speed range of the engine body, and an intake bypass passage configured to bypass the small compressor chamber, the large compressor chamber is disposed on an upstream side of the small compressor chamber in the intake passage, a large turbo axis as an axis of the large turbine shaft and a small turbo axis as an axis of the small turbine shaft are disposed to extend in a same direction as the engine output axis, and the large turbo unit is disposed with respect to the engine body, wherein the large turbo axis is non-parallel to the engine output axis to form an angle between the large turbo unit axis and the engine output axis from a rear surface of the engine body towards a front surface of the engine body, and a portion of the large turbo axis on a side of the large compressor chamber is closer to the engine output axis than a portion of the large turbo axis on a side of the large turbine chamber in a plan view in an axis direction of the cylinder from a rear surface of the engine body towards a front surface of the engine body.

2. The turbocharger engine according to claim 1, wherein the small turbo unit is positioned between the large turbo axis and the engine output axis in the plan view.

3. The turbocharger engine according to claim 2, wherein the small turbo unit is positioned at a portion of the small turbo axis on a side of the small compressor chamber which is closer to the large turbo axis than a portion of the small turbo axis on a side of the small turbine chamber in the plan view.

4. The turbocharger engine according to claim 3, wherein the cylinder of the engine body includes a plurality of the cylinders arranged in series, and
the large compressor chamber is disposed in a vicinity of a surface of the engine body in the axis direction of the plurality of the cylinders.

5. The turbocharger engine according to claim 2, wherein the cylinder of the engine body includes a plurality of the cylinders arranged in series, and
the large compressor chamber is disposed in a vicinity of a surface of the engine body in the axis direction of the plurality of the cylinders.

6. The turbocharger engine according to claim 1, wherein the cylinder of the engine body includes a plurality of the cylinders arranged in series, and
the large compressor chamber is disposed in a vicinity of a surface of the engine body in the axis direction of the plurality of the cylinders.

* * * * *